United States Patent
Li et al.

(10) Patent No.: US 6,422,396 B1
(45) Date of Patent: Jul. 23, 2002

(54) COALESCER FOR HYDROCARBONS CONTAINING SURFACTANT

(75) Inventors: Yu Li, LaGrange; Jon A. Schnable, Sharpsburg; Holly T. Hill; Roger K. Miller, both of LaGrange, all of GA (US)

(73) Assignee: Kaydon Custom Filtration Corporation, LaGrange, GA (US)

( * ) Notice: Subject to any disclaimer, the term of this patent is extended or adjusted under 35 U.S.C. 154(b) by 0 days.

(21) Appl. No.: 09/398,125

(22) Filed: Sep. 16, 1999

(51) Int. Cl.⁷ .............................................. B01D 17/022
(52) U.S. Cl. .................. 210/489; 210/492; 210/493.5; 210/497.01; 210/799; 210/DIG. 5
(58) Field of Search ......................... 210/DIG. 5, 488, 210/489, 490, 492, 799, 493.1, 493.5, 497.01

(56) References Cited

U.S. PATENT DOCUMENTS

| | | |
|---|---|---|
| 2,701,062 A | 2/1955 | Robinson |
| 2,739,713 A | 3/1956 | Robinson |
| 2,864,505 A | 12/1958 | Kasten |

(List continued on next page.)

FOREIGN PATENT DOCUMENTS

| | | |
|---|---|---|
| GB | 936917 | 9/1963 |
| GB | 1082810 | 9/1967 |
| GB | 1209085 | 10/1970 |
| GB | 2078536 A | 1/1982 |
| WO | WO96/33789 | 10/1996 |
| WO | WO9814257 | 4/1998 |
| WO | WO98/40206 | 9/1998 |

OTHER PUBLICATIONS

Hazlett, R. N., "Fibrous Bed Coalescence Of Water," *I & EC Fundamentals*, vol. 8, No. 4, Nov. 1969, pp. 625–632.

Hazlett, R. N. and Carhart, H. W., "Removal of Water From Fuel Using a Fibrous Bed," Preceedings of the Filtration Society, Filtration & Separation/Jul./Aug. 1972, pp. 456–467.

Hughes, V. B., "Aviation Fuel Handling: New Mechanistic Insight Into The Effect Of Surfactants On Water–Coalescer Performance," 2nd International Filtration Conference, San Antonio, U.S., Apr. 1–2, 1998, pp. 92–104.

*Primary Examiner*—Robert Popovics

(57) ABSTRACT

A coalescer filter element for the separation of water from hydrocarbon fluids, such as kerosene, jet fuel, diesel fuel, and gasoline under surfactant conditions such as thermal stability additive and dispersant. Coalescer fibrous material has hydrophobic properties which resist surfactant coating of the fibers thereby allowing breakdown of water emulsion in the hydrocarbon fluids. The coalescer has a negative media density gradient in the liquid flow direction.

36 Claims, 2 Drawing Sheets

U.S. PATENT DOCUMENTS

| | | |
|---|---|---|
| 2,911,101 A | 11/1959 | Robinson |
| 3,026,609 A | 3/1962 | Bryan |
| 3,115,459 A | 12/1963 | Giesse |
| 3,228,527 A | 1/1966 | McPherson |
| 3,229,817 A | 1/1966 | Pall |
| 3,239,452 A | 3/1966 | Christiaan van Beest et al. |
| 3,268,442 A | 8/1966 | Pall et al. |
| 3,645,398 A | 2/1972 | Fiocco |
| 3,794,583 A | 2/1974 | Rhodes |
| 4,052,316 A | 10/1977 | Berger, Jr. et al. |
| 4,058,463 A | 11/1977 | Bartik |
| 4,102,785 A | 7/1978 | Head et al. |
| 4,127,500 A | 11/1978 | Suzuki et al. |
| 4,253,954 A | 3/1981 | Midkiff et al. |
| 4,292,179 A | 9/1981 | Stone et al. |
| 4,299,699 A | 11/1981 | Boogay |
| 4,309,289 A | 1/1982 | Head |
| 4,320,005 A | 3/1982 | DeGraffenreid |
| 4,411,791 A | 10/1983 | Ward |
| 4,661,227 A | 4/1987 | Reeder, Jr. et al. |
| 4,788,825 A | 12/1988 | Calupca et al. |
| 4,871,455 A | 10/1989 | Terhune et al. |
| 4,886,599 A | 12/1989 | Bachmann et al. |
| 4,888,117 A | 12/1989 | Brown et al. |
| 4,892,667 A | 1/1990 | Parker, III et al. |
| 4,915,714 A | 4/1990 | Teague et al. |
| 5,017,294 A | 5/1991 | Durrieu |
| 5,174,907 A | 12/1992 | Chown et al. |
| 5,439,588 A | 8/1995 | Chown et al. |
| 5,443,724 A | 8/1995 | Williamson et al. |
| 5,474,672 A | 12/1995 | Peterson et al. |
| 5,480,547 A | 1/1996 | Williamson et al. |
| 5,575,896 A | 11/1996 | Sams et al. |
| 5,596,130 A | 1/1997 | Wright et al. |
| 5,621,154 A | 4/1997 | Wright et al. |

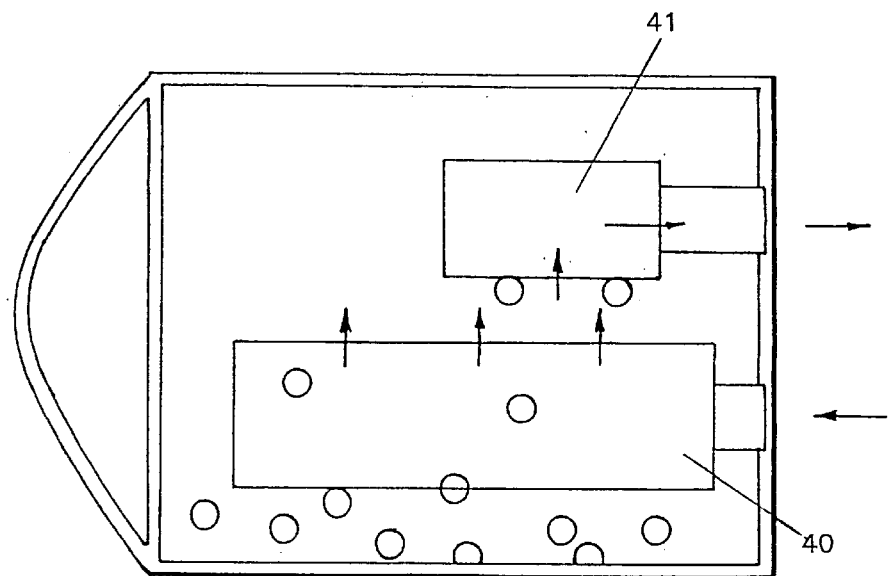
Fig. 5A
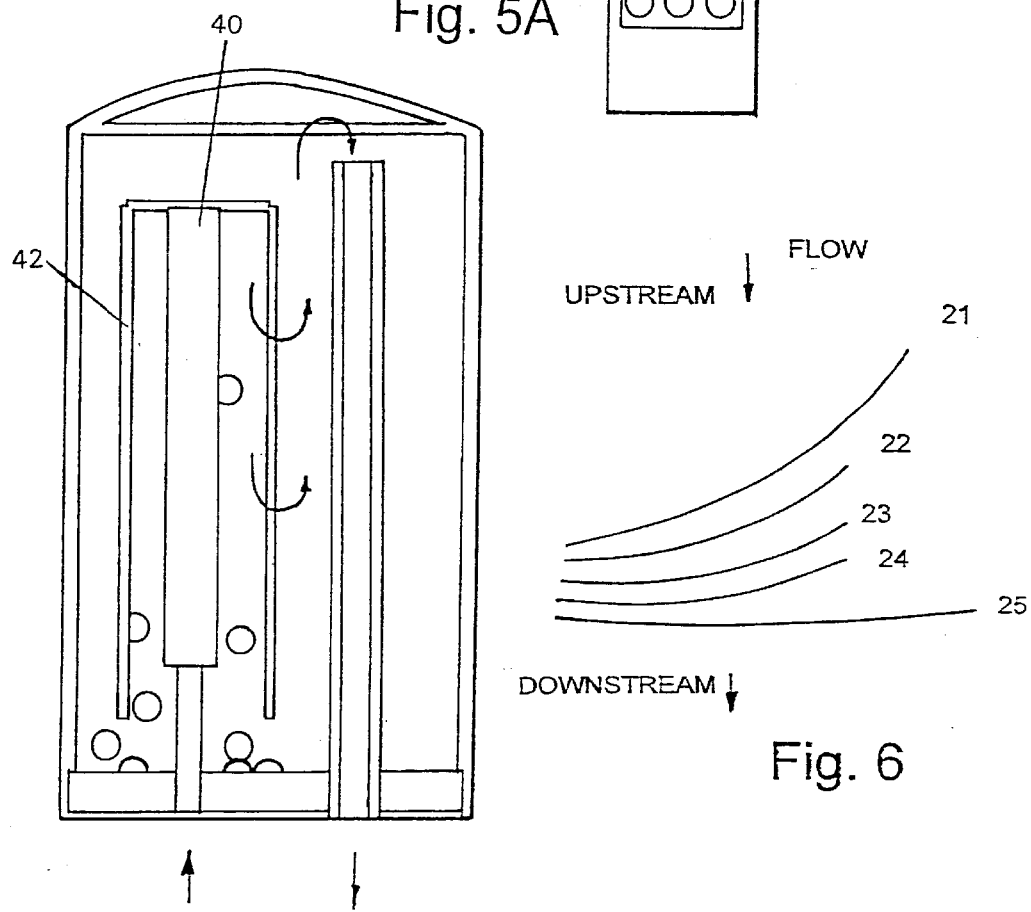
Fig. 5B
Fig. 6

COALESCER FOR HYDROCARBONS CONTAINING SURFACTANT

FIELD OF THE INVENTION

This invention relates to a method for efficiently separating water from hydrocarbons under surfactant conditions. More particularly, the present invention is directed to a method of separating a discontinuous phase of water from continuous phase hydrocarbons, such as aviation jet fuel, kerosene, gasoline, diesel fuel, and light cycle oil under the presence of a surfactant such as the thermal stability additive disclosed in U.S. Pat. No. 5,596,130.

BACKGROUND OF THE INVENTION

U.S. Pat. No. 5,596,130

Turbine combustion fuel oils are used as a heat sink in integrated aircraft thermal systems to cool aircraft subsystems and the engine lubricating oil. The turbine combustion fuel oil is circulated in the airframe to match heat loads with available heat sink. In current aircraft, these thermal stresses raise bulk fuel temperatures to as high as 425° F. at the inlet to the main burner fuel nozzles and above 500° F. inside the fuel nozzle passages. In future aircraft, these temperatures are expected to be 100° higher.

At these high temperatures and oxygen-rich atmospheres in aircraft and engine fuel system components, fuel degrades forming gums, varnishes, and coke deposits. These deposits plug-up the components leading to operational problems including reduced thrust and performance anomalies in the augmentor, poor spray patterns and premature failure of main burner combustors and problems with fuel controls. Further, the engine exhaust becomes smoky and sooty and engine noise increases, both of which are undesirable characteristics for jet engines.

An economical solution to inhibit deposit formation is to add additives to the turbine combustion fuel oil prior to their combustion as propulsion fuels. As indicated in U.S. Pat. No. 5,596,130, it was found that the existing deposits are efficiently inhibited and removed by the addition of derivatives of polyalkenyl (thio) phosphonic acids to the turbine combustion fuel oil. Likewise, the formation of exhaust soot and smoke is inhibited and engine noise reduced.

JP8+100 Fuel

The U.S. military's newly developed jet fuel, JP8+100, is for use in the next generation of military aircraft. The new fuel with thermal stability additive not only increases thermal stability of jet fuel, but also largely reduces the maintenance costs of aircraft engine due to the fact that a thermal stability additive can inhibit the formation of fouling deposits on engine components. However, the traditional design water/fuel coalescers utilizing fiberglass materials are disarmed by surfactant type thermal stability additive, and therefore, fail to pass performance requirements (refer to American Petroleum Institute 1581 Specification, Fourth Edition). Hence, in order to develop a novel coalescer design with surfactant insensitive media to successfully separate water from fuel JP8+100, it is important to understand the effect of thermal stability additive on coalescence and the disarming mechanism of the conventional fiberglass coalescer.

The Disarming Mechanism of Conventional Coalescer

The disarming mechanism for traditional fiberglass coalescer by additives involves two considerations. (1) Surfactants can remarkably reduce interfacial tension, stabilize an emulsion, and even form a micro-emulsion resulting in tiny water droplets ranging from 0.01 to 0.2 µm. This stable micro-emulsion will make coalescence very difficult. (2) The polar head of surfactants can be adsorbed or coated on the hydrophilic site of certain fibrous media such as fiberglass. On the other hand, the straight chain hydrocarbon tail of surfactants, having both hydrophobic and oleophilic properties, can make the fiber surface completely change wettability from hydrophilic to hydrophobic, since surfactants have more affinity than water. Water droplets will not be captured by the wettability of fiber surface. Therefore, surfactants can disarm the fiber glass coalescers by combining the above two effects.

Prior Art to Filter Under [Strong] Surfactant Conditions

There are two conventional ways to remove water from hydrocarbon based fluids with surfactants present.

1) The first method uses a two-stage system including a clay treater and conventional coalescer. After surfactants in hydrocarbon fluids are removed by the clay treater, then the conventional coalescer is used to remove water. The clay treater consists of diatomaceous earth which can adsorb surfactants. Such treatment however, will remove all surfactants: desirable and undesirable. For example, thermal stability additive in JP8+100 fuel is the desirable surfactant for ensuring thermal stability and reducing maintenance. Another apparent drawback for a clay treater is that it can be disarmed by a large amount of water. Hence a clay filter is not feasible for this application.

2) The second method employs an absorption type filter to absorb water within the structure of its hydrophilic absorbing polymer. Even though filters with absorption media can effectively eliminate water from hydrocarbons under the presence of surfactants, they have limited life due to the saturation capacity of their media. Especially for the conditions such as hydrocarbon fluids with high water content e.g. 3% water, absorbing type filters will reach the saturation limit in a short period of time. Therefore, flow will be forced to shut down and the filter must be replaced.

In summary, both methods have significant disadvantages: the former removes desirable surfactants and the latter is not economically feasible.

Novel Coalescer Media

With specially formulated novel media, the novel coalescer system can overcome the negative effect caused by surfactants (e.g. thermal stability additive), such as lower interfacial tension, coating of fiber surface, uncontrolled wettability and stabilized microemulsion. This design can simultaneously and efficiently remove water and solid contaminants from hydrocarbon fluids containing surfactants, such as JP8+100 fuel, with long service life.

Conventional Mechanisms of Coalescence

The conventional mechanism of coalescence in a fibrous bed is explained by the Hazlett model. The model consists of four main steps: (1) Approach of a droplet to a fiber, (2) Attachment of the droplet to the fiber, (3) Coalescence of attached droplets on the fiber, and (4) Release of enlarged droplets from the downstream side of the fiber bed. Thus, coalescing water droplets from the hydrocarbon phase requires a hydrophilic site in a fibrous bed in order to attach water droplets to fibers. The glass fiber medium applied in conventional coalescer device has a surface which has both hydrophilic (silanol group) and hydrophobic (organic resin) regions. It is widely accepted that water interception and growth occurs at the hydrophilic sites. When the surfactants are present, the polar head of the surfactant can also be adsorbed at the hydrophilic sites. Such a process causes disarming of the coalescer unit. This coating phenomena of fiber surface by surfactant has been evidenced by using Environmental Scanning Electron Microscopy (ESEM). See Hughes, V. B., $2^{nd}$ International Filtration Conference, Apr. 1–2, 1988.

DESCRIPTION OF RELATED ART

Numerous references disclose multiple layer coalescers including a pleated fiber glass layer. For example, WO 98/14257 discloses a multiple layer (10,20) coalescer including a coalescing media 10 which may be comprised of glass fibers (see page 5, line 17) and which may be pleated (see page 5, line 13). The WO 98/14257 publication also discloses that coalescing media 10 may be comprised of polyester.

U.S. Pat. No. 5,480,547 discloses a multiple layer coalescer including a glass fiber layer (see column 6, line 18) and a fibrous polyester layer (see column 6, line 67).

U.S. Pat. No. 4,892,667 teaches a multiple layer coalescer including a pleated paper layer (see column 3, line 57), and also including a polyvinyl chloride coated screen 75 (see column 6, line 33).

U.S. Pat. No. 4,888,117 discloses a coalescer cartridge comprising a polymeric media having a fine porous structure which may be fabricated from a suitable polymeric material such as polyethylene or polypropylene (see column 1, line 65–68).

U.S. Pat. No. 4,102,785 describes a filter tube including an open scrim sheet material embedded within a wall of the filter tube. The filter tube may be comprised of a plurality of nonwoven fibers having interstices defining a porous filter.

SUMMARY OF THE INVENTION

The present invention is directed to a coalescing filter element for the separation of water from hydrocarbon fluids under surfactant conditions. It overcomes many of the shortcomings of conventional methods of removing the aqueous phase from a hydrocarbon phase in the presence of surfactants. The presence of surfactants can disarm the conventional coalescer element in two ways, as noted previously: (1) surfactants reduce interfacial tension and form a stable microemulsion to prevent coalescence, (2) surfactants can be adsorbed or coated on the fiber media, and change its characteristics such. as wettability. Such a process can disarm the coalescence action. The present invention discloses a novel coalescer media which is resistant to surfactant coating, and provides a new coalescer device to successfully remove dirt and water from hydrocarbon fluids.

BRIEF DESCRIPTION OF THE DRAWINGS

FIG. 5A is a schematic flow diagram showing a stand-alone coalescer and separator element for example 2 described herein; and FIG. 5B is a schematic flow diagram showing a coalescer with a canister separator for example 1 described herein;

FIG. 6 is a diagrammatic showing of a preferred detailed design of a prefilter.

DETAILED DESCRIPTION OF THE INVENTION

Figure 1:
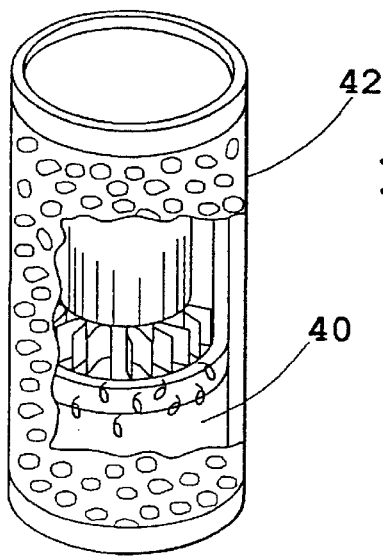
FIG. 1 is a perspective view of a coalescer inside an open ended canister-style separator, with portions of separator and coalescer broken away to illustrate the internal components of the coalescer.

The term coalescer is also commonly referred to as a coalescer unit, a coalescer device, and a coalescer element.

For years it has been the view of many schools of thought in industry that coalescer media with hydrophobic properties did not intercept water droplets, so that water droplets would migrate without coalescence through the media. The invention in this present development proves this accepted theory is not valid in the presence of surfactants when certain features are employed. The novel coalescer applies a new approach by using an opposite approach regarding wettability of the fiber media for coalescing water droplets. The new coalescer device features complete hydrophobic properties of media to resist surfactant coating, a coalescing layer with fine fiber diameter and low surface tension to catch tiny water droplets in microemulsion, and a negative porosity gradient of the coalescer bed to enlarge water droplets and prevent re-entrainment.

The present invention is particularly directed to removal of water from aviation fuel, such as JP8+100 fuel, which contains the thermal stability additive disclosed in U.S. Pat. No. 5,596,130, which is incorporated herein by reference. The new fuel with thermal stability additive not only increases the thermal stability, but also largely reduces the maintenance costs of aircraft engines. However, the conventional coalescers are disarmed by surfactants such as the type thermal stability additive, and therefore, fail to pass performance requirements. The newly invented coalescer/separator can reduce water concentration from 3% to less than 15 ppm (undissolved) on a single pass. The present invention can be used as a direct replacement of conventional coalescers for currently existing vessels.

This invention also offers much longer life than water absorbing polymer type filters which are currently used for separation of water from aviation fuel under the presence of [strong] surfactants. The present invention can offer indefinite life in terms of water removal, in contrast to current water absorbing polymer type filters which have only limited life due to saturation capacity.

The invented coalescer unit can be used with an open ended canister separator or with a sealed separator element. The invention can be used with sealed separator in either a vertical or a horizontal configuration, or without a separator in the horizontal configuration.

The present invention can be employed at temperatures from 40 to 180° F. The coalescing section of this invention contains materials that have hydrophobic properties which resist surfactant coating. The first layer of coalescing material has fine diameter fiber and low surface tension for breaking micro-emulsions caused by surfactants. Preferably polypropylene is used as this low surface tension material. The remaining layers consist of multiple layered synthetic media, preferably formed polyester. The multiple layer design creates a negative density gradient which enhances coalescence and prevents re-entrainment. The combination of hydrophobic layer materials and negative porosity gradient has resulted in unique beneficial operational characteristics. The preferred flow direction in this invention is inside to outside.

A built-in pleated media section, i.e. a prefilter, inside the coalescer section is designed to stop particulates from plugging the coalescer media. Due to service life requirements of the coalescer element, it is important that the prefilter have high dirt holding capability. The prefilter has a multiple layer medium design to create larger pores upstream and smaller pores downstream. The prefilter multiple layer design thus provides high dirt holding capacity and also initiates/promotes coalescence. The prefilter section preferably consists of five total layers, three nonwoven filter media and two open mesh screen layers. Open wire screen backing on both sides of medium layers provides a sturdy structure for burst and collapse resistance. Furthermore, the screen layers prevent flow blockage by preventing pinching of the pleats.

Figure 2:
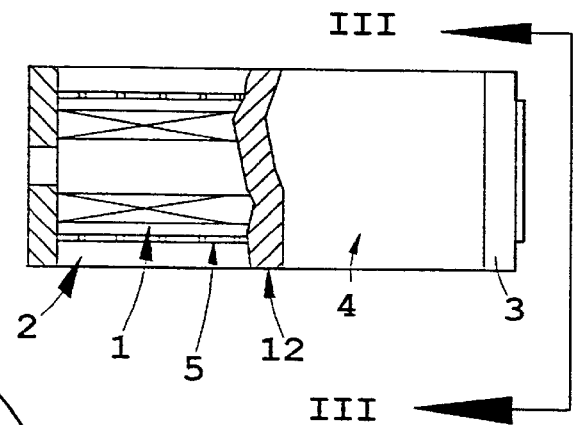
FIG. 2 is a plan view with a partial cutaway of the unit in FIG. 1.

Referring to FIGS. 1 and 2, when hydrocarbon fluids with entrained water and solid particulates travel through a coalescer and separator, filtration and coalescence occurs in three stages: prefiltration, coalescence, and separation. Prefiltration occurs in the pleated media section 1 upstream of the coalescer section 2, to remove solid particulates and protect the coalescer from plugging. Prefiltration also can help to initiate coalescence. Coalescence includes three stages: 1) Tiny water droplets are subjected to a tortuous path of gradient porosity nonwoven fibers, 2) Droplets are held by hydrophobic fibers, and flow forces the smaller water droplets to collide and join together to form larger water droplets, 3) Since water has a higher specific gravity than the hydrocarbon fluids, larger coalesced water droplets will release from the fiber, exit the coalescer and settle to the bottom of the pressure vessel. Separation of the coalesced water droplets is accomplished by the hydrophobic screen of the separator which prevents coalesced droplets of sufficient size penetrating the screen, and directs the droplets to the water collection area of the vessel. The hydrophobic screen allows only the hydrocarbon fluids to penetrate it, but stops the coalesced water droplets.

FIG. 5A shows a coalescer element 40 used with a separate (stand-alone) separator element 41.

FIG. 5B shows a coalescer element 40 used with an open ended canister separator 42. Both separators incorporate the hydrophobic screen. Also, the coalescer device can be used in either a vertical or horizontal configuration with separators. The coalescer element can be used even without a separator when the coalescer system is in a horizontal configuration.

The coalescer system can be operated at temperatures between 40 and 180° F. This coalescer system is operated most efficiently at a temperature between 60 and 90° F. for JP8+100 fuel. Also, the novel system may contain as few as one coalescer inside a pressure vessel, or a plurality of such units.

Figure 3:
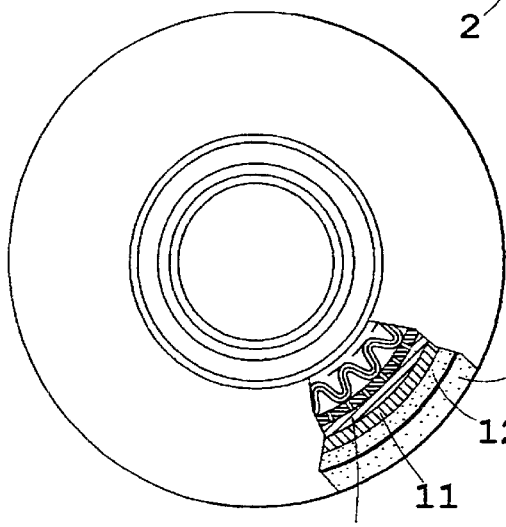
FIG. 3 shows an end cap view of the embodiment in FIG. 2 with portions broken away.

Referring to FIGS. 2 and 3, the flow direction for the coalescer device can be inside to outside or outside to inside. Flow direction from inside to outside is preferred.

Traditional coalescer mechanisms use hydrophilic media for removing water from hydrocarbons. However, as noted previously, the hydrophilic media are disarmed when a surfactant is present. One aspect of the disarming mechanism in hydrophilic media of a. traditional coalescer occurs by hydrophilic media adsorbing or being coated by surfactants. In contrast, the coalescer material of this invention has hydrophobic properties to prevent surfactant coating.

Another aspect of the disarming mechanism by surfactants is that surfactants can stabilize an emulsion and form a micro-emulsion, resulting in very tiny water droplets ranging from 0.01 to 0.2 $\mu$m. A stable micro-emulsion makes coalescence very difficult. In designing the present coalescer to coalesce these tiny water droplets, the following parameters in this coalescer are considered: fiber type, fiber diameter, media density gradient, depth of the media, wettability and surface roughness. Specifically, fine fibers are located in the upstream portion of the coalescer section and coarse fibers are located in the downstream of the coalescer section. This arrangement provides a negative media density gradient which is important for performing coalescence in this environment. A minimum depth of the media bed is selected for enlarging water droplets to a certain desired size, allowing them to release from the fibers and settle out. Wettability and surface roughness enhance the adsorption of water droplets to the fibers and promotes further growth in droplet size. Optimization of these parameters is desired for overcoming the disarming effects of surfactants, and resulting successful coalescence.

All the coalescer media 2, 12, 4 in FIG. 2 in the novel coalescing device have hydrophobic properties, i.e., water repellency.

Components of the coalescing cartridge include end cap 3 which may comprise metal, polymeric material, composite or elastomers. In this embodiment, metal aluminum and composite, e.g., fiber reinforced plastic, end caps are preferred. The end cap 3 is bonded to coalescer media 2, 12, 4 and pleated media 1 in any suitable manner. For example, the end caps 3 may be bonded to coalescer media 2, 12, 4 by heat fusion (thermal bonding), ultrasonic welding, friction (or spin) welding, polycapped, solvent bonding, or adhesive bonding. The adhesives used can be epoxy, polyurethane, and/or plastisol, for example. Epoxy and polyurethane are preferred.

Figure 4:
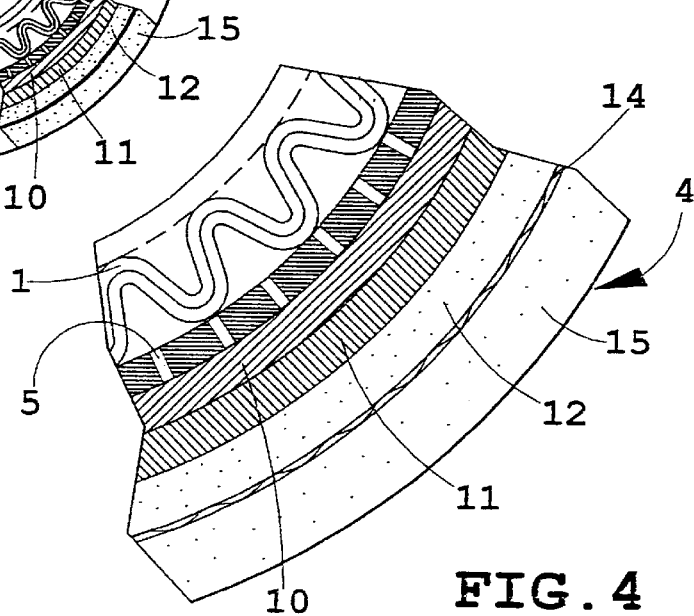
FIG. 4 is an enlarged sectional view of a cutaway portion of the end displayed in FIG. 3.

The coalescer element also comprises a rigid support tube 5. The support tube 5 offers structural radial support for pleated media 1 and coalescer bun 2. With reference to FIG. 4, the pleated media 1 and the first coalescer media layer 10 lie adjacent to the coaxially positioned support tube 5. Perforated support tube 5 can be metal, plastic, or a composite material with perforated holes. The perforated metal tube is preferred.

Hydrocarbon fluids are often contaminated by solid particulates through transportation and storage. The solid particulates can be dust from air, rust from metal pipeline and/or storage reservoir, or any other contaminants from different sources. These particulates in hydrocarbon fluids can cause severe damage such as erosion of pump and pipe, or blockage of burning nozzles, if not eliminated by filtration. Particulates in hydrocarbon fluids are typically removed by the filter medium using the following mechanisms: direct interception, inertial impaction and diffusion. There are two types of filtration. Surface filtration and depth filtration. Surface filtration works largely by direct interception. Particles, which are larger than the pore size of the medium, are retained at the upstream surface of the filter. Depth filtration employs a medium with a significant amount of thickness providing filtering in depth. Depth filtration can provide better overall performance than purely mechanical action of direct interception. The inertia of particles impinging directly on to the filter medium may generate adsorptive surface forces.

Surfactants in hydrocarbon fluids, such as thermal stability additives, may act as a dispersant to keep particulates well suspended in hydrocarbon fluids, and also prevents them from agglomerating together. Therefore, well dispersed fine particulates tend to penetrate the conventional prefilter media to plug and disarm the coalescer media or break through the coalescer section to contaminate the downstream fuel. In designing the prefilter for hydrocarbon fluids containing surfactants, two factors must be considered: removal efficiency (downstream cleanliness) and dirt holding capacity (service life).

The purpose of the prefilter section 1 inside coalescer bun 2 is to stop, i.e., capture, particulates so such will not transfer to and be captured in the coalescer bun. Capture of particulates in the coalescer bun would diminish its ability to perform coalescence. Due to service life requirements, i.e., dirt holding capacity, of the coalescer assembly, the prefilter section should have high dirt holding capacity.

The present development with its prefilter multi-layer configuration provides high dirt holding capacity and high removal efficiency. The prefilter section preferably consists of five total layers, i.e., three nonwoven layers of a hydrophilic material such as a glass fiber filter media and two open mesh screen layers. The material forming the three layers is preferably of glass microfiber, i.e., of small fiber diameter. These materials may be manufactured by the traditional wet laid media making process. In addition to being strengthened by the inclusion of a binder such as latex, acrylic polymers or polyvinyl alcohol, these media are usually made more robust by being laminated to a scrim of spunbonded synthetic material on one or both sides, thereby enhancing strength, durability and pleatability.

In the present depiction of the invention, three nonwoven fiber glass media layers 22, 23 and 24 are displayed (see FIG. 6). The three layer design has a positive density gradient, i.e., coarser fiber at the upstream portion and finer fiber downstream. The three layer design offers better overall performance in terms of dirt holding capacity and removal efficiency by applying depth filtration mechanism as described previously. The Frazier air permeability of layer 22 preferably ranges from 15 to 25 cfm/ft$^2$ @ 0.5 H$_2$O ΔP. The average basis weight is preferably 80±10 lbs/3000 ft$^2$. The Frazier air permeability of layer 23 preferably ranges from 8 to 15 cfm/ft$^2$ @ 0.5 H$_2$O ΔP. The average basis weight is preferably 60±15 lb/3000 ft$^2$. The Frazier air permeability of layer 24 preferably ranges from 2 to 5 cfm/ft$^2$ @ 0.5 H$_2$O ΔP with an average basis weight 83±15 lb/3000 ft$^2$. Average basis weight refers to an average weight per unit of area of a sheet or layer of material. The average density can be determined by dividing the average basis weight by the thickness of the sheet or layer of material.

As shown in FIG. 6, there is metal wire or synthetic screen backing 21 and 25 on both sides of the three layer fiberglass media to provide sturdy structure for burst resistance. In this embodiment, metal wire with epoxy coating is preferred. The screens also prevent flow blockage from pinching of the media pleats.

The main function of the coalescer bun 2 is to break up the micro-emulsion of water and hydrocarbon fluids caused by surfactants and to develop large water droplets. The coalescer bun has finer fiber polypropylene media with low surface tension located at the upstream portion of coalescer, which is designed to catch tiny water droplets. The whole coalescer bun has hydrophobic property to resist surfactant coating. The coalescer bun has a negative pore density gradient from upstream to downstream, i.e., finer media with smaller pore size is located upstream and coarser media with larger pore size is located downstream. As far as is known, prior coalescers have relied on hydrophilic properties, not hydrophobic. And, prior units have used positive pore density characteristics, not negative. This novel combination has proven to be highly effective for removal of water from fuel containing surfactants.

As shown in FIG. 4, coalescer bun 2 is preferably made by wrapping a plurality, preferably three, hydrophobic layer media 10, 11, 12 in sequence around the exterior of tube 5. At least the first layer preferably has sufficiently low surface tension to break up an emulsion of water in the hydrocarbons. A screen 14 is wrapped around media layers 10, 11, 12 and polyester scrim to compress the coalescer bun 2. The wrapping structure can also be achieved by other means such as spiral wrapping with metal or plastic screen.

The first coalescer media layer 10 is preferably made of polypropylene. The Frazier air permeability of media 10 preferably ranges from 8 to 15 cfm/ft$^2$ at 0.5" H$_2$O ΔP. The average basis weight is preferably 246±10 lb/3000 ft$^2$. A single sheet of the above material 10 is used, or multiple sheets may be used. The second coalescer media layer 11 is preferably made of polyester. The Frazier air permeability of media layer 11 preferably ranges from 120 to 170 cfm/ft$^2$ at 0.5" H$_2$O ΔP. The average basis weight is 168±8 lb/3000 ft$^2$. A single sheet of the above material 11 is used, or multiple sheets may be used. The third coalescer media layer 12 is preferably made of polyester. The Frazier air permeability of media 12 ranges from 800 to 1000 cfm/ft$^2$ at 0.5" H$_2$O ΔP. The average basis weight is 99±6 lb/3000 ft$^2$. A single sheet of the above material 12 is used, or multiple sheets may be used.

A hydrophobic drainage layer 15 is located downstream of the coalescer bun and contained by an outer sleeve 4. The main function of drainage layer 15 is to enlarge water droplet and prevent re-entrainment. Therefore, this layer has much higher open porosity than coalescing layer. The material of drainage layer 15 may be made from a felt of polyester or other synthetic material, preferably polyester. The Frazier air permeability of media 15 ranges from 800 to 1000 cfm/ft$^2$ at 0.5" H$_2$O ΔP. The average basis weight is 99±6 lb/3000 ft$^2$. A single sheet of the above material 15 is used, or multiple sheets may be used.

Outside layer sleeve 4 is made of hydrophobic media. The purpose of sleeve 4 is to prevent fiber migration from drainage layer 15, and also protect the coalescer from damage. Sleeve 4 is preferably made of polyester synthetic media having the following properties: a Frazier air permeability of about 1600 cfm/ft$^2$ at 0.5" H$_2$O ΔP, nominal basis weight of about 0.6 oz/yd$^2$, and nominal thickness of about 4 mils. Other materials having similar properties such as air permeability and basis weight can also be used in this invention.

Examples of Novel Coalescer Performance

EXAMPLE 1

3.75"×40" DOD style coalescer with canister separator for American Petroleum Institute (API) 1581, Fourth Edition, single element test. Both coalescer and separator were in vertical configuration, as shown in FIG. 5B.

Single element tests at a 40 gallon per minute (gpm) flow rate were conducted. The coalescer used in single element testing was 3.75"×40" DOD style using O-ring seals. The separator used for this testing was a traditional canister separator selected for the purpose of direct replacement in existing vessels. The design parameters of the coalescer and separator are listed in Table 1.

TABLE 1

The design parameters for coalescer and separator

| DOD Style Coalescer | | Canister Style Separator | |
|---|---|---|---|
| Diameter (O.D.) | 3.75" max. | Diameter (O.D.) | 5.31" |
| Length | 40.00" | Length | 42.45" |
| End cap seal | O-ring | End cap style | One end open, one end closed |
| Flow direction | Inside-out | Flow direction | Inside-out |

Additive package was added to clay treated jet fuel according to API 1581, Fourth Edition, section 4.2.4.2 for category M100 as follows. The mixing time was determined to be 20 mins. The fuel tank used for this testing was 250 gallon capacity. The amounts of additives are listed in Table 2. It is noted that the thermal stability additive SPEC AID 8Q462 manufactured by Betz Dearborn is a surfactant acting as dispersant.

TABLE 2

Additive concentration and quantity

| Additives | Supplier | Concentration | | In 250 gal |
|---|---|---|---|---|
| Betz 8Q462 | Betz Dearborn | 256 | mg/L | 246.15 g |
| DiEGME | Aldrich Chemical | 0.20% | 1.895 | liter |
| Stardis 450 | Octel America | 2 | mg/L | 1.920 g |
| Petronate L | Witco | 0.4 | mg/L | 0.385 g |
| DCI-4A | Octel America | 15 | mg/L | 21.635 g |

The test was run according to API 1581, Fourth Edition. The operated flow rate of fuel was 40 gallons per minute (gpm). After water was injected in the fuel, the water and fuel was formed into an emulsion by a centrifugal pump. Then, the water/fuel emulsion entered the coalescer and separator for separation. Free water content was measured by ASTM D3240 using AquaGlo test kit. The test results showed the free water downstream of coalescer was consistently less than 3 ppm per single pass for 180 min 0.01% water injection and 30 min 3% water injection upstream of coalescer system. The solids are injected into the jet fuel by slurry feeding to ensure complete mixing, and then enter the coalescer system. Total solids are determined by ASTM D2276 using Millipore test kit with matched weight membrane. For 75 minute solid injection, total solids in fuel drops from 72 mg/gal upstream to less than 0.3 mg/gal downstream. The average pressure drop is 9.3 psi at 50 mins, and 17.3 psi at 75 mins. Throughout the entire test a bright and clear fuel was visually observed downstream of the coalescer system.

EXAMPLE 2

6"×14" API style coalescer with 6×6 separate separator for API 1581 single element test. Both coalescer and separator were in horizontal configuration, as shown in FIG. 5A.

Single element tests for the coalescer at 33.44 gpm flow rate were conducted. The coalescer used in single element testing was 6"×14" API style using gasket seals. The separator used for this testing was double open ended. The design parameters of the coalescer and separator are listed in Table 3. The test stand was built according to API 1581. The vessel containing coalescer and separator was constructed to simulate current API horizontal design as shown in FIG. 5A.

TABLE 3

The design parameters for Kaydon coalescer and separator

| API Style Coalescer | | API Style Separator | |
|---|---|---|---|
| Diameter (O.D.) | 6" max. | Diameter (O.D.) | 6" |
| Length | 14" | Length | 6" |
| End cap seal | Gasket Seal | End cap seals | Gasket Seal |
| Flow direction | Inside-out | Flow direction | Outside-in |

Additive package was added to clay treated jet fuel according to API 1581, Fourth Edition, section 4.2.4.2 for category M100 as follows. The mixing time was determined to be 20 mins. The fuel tank used for this testing was 250 gallon capacity. The amounts of additives are listed in Table 2. It is noted that additive SPEC AID 8Q462 manufactured by Betz Dearborn is a surfactant acting as dispersant.

The test was run according to API 1581, Fourth Edition. The operated flow rate was 33.44 gallon per minute (gpm). After water was injected into the fuel, the water and fuel were formed into an emulsion by a centrifugal pump. Then, the water/fuel emulsion entered the coalescer and separator for separation. Free water content was measured by ASTM D3240 using AquaGlo test kit. The test results showed the free water downstream of the coalescer to be consistently less than 3 ppm per single pass for 180 mins 0.01% water injection and 30 min 3% water injection. The solids are injected into the jet fuel by slurry feeding to ensure complete mixing, and then enter the coalescer system. Total solids are determined by ASTM D2276 using Millipore test kit with matched weight membrane. For 75 minute solid injection, total solids in fuel drops from 72 mg/gal upstream to less than 0.1 mg/gal downstream. The average pressure drop is 11.0 psi at 50 mins., and 19.5 psi at 75 mins. Throughout the entire test a bright and clear fuel was visually observed downstream of the coalescer.

The above description is considered that of the preferred embodiment(s) only. Modifications of the invention will occur to those skilled in the art and to those who make or use the invention. Therefore, it is understood that the embodiment(s) shown in the drawings and described is/are merely for illustrative purposes and not intended to limit the scope of the invention, which is defined by the following claims as interpreted according to the principles of patent law, including the doctrine of equivalents.

What is claimed is:

1. A coalescer for removing water from hydrocarbon fluids, comprising:

porous hydrophobic media for passage of hydrocarbon fluids therethrough;

said media comprising at least three hydrophobic layers, said layers having a negative density gradient with small pores upstream and larger pores downstream, the three layers include a first layer having a Frazier air permeability of from 8 to 15 cfm/ft$^2$ at 0.5" $H_2O$ $\Delta P$ and an average basis weight of 246±10 lb/3000 ft$^2$, a second layer having a Frazier air permeability of from 120 to 170 cfm/ft$^2$ at 0.5" $H_2O$ $\Delta P$ and an average basis weight of 168±8 lb/3000 ft$^2$, and a third layer having a Frazier air permeability of from 800 to 1000 cfm/ft$^2$ at 0.5" $H_2O$ $\Delta P$ and an average basis weight of 99±6 lb/3000 ft$^2$.

2. The coalescer in claim 1 wherein said plurality of hydrophobic layers are of polymeric material.

3. The coalescer in claim 1 wherein said plurality of hydrophobic layers are of polypropylene.

4. The coalescer in claim 1 including a prefilter upstream of said plurality of hydrophobic layers.

5. The coalescer in claim 4 wherein the prefilter comprises a plurality of hydrophilic layers.

6. The coalescer in claim 4 wherein said prefilter comprises a plurality of layers having a positive density gradient.

7. A coalescer for removing water from hydrocarbon fluids, comprising:

porous hydrophobic media for passage of hydrocarbon fluids therethrough;

said media comprising a plurality of hydrophobic layers, said layers having a negative density gradient with smaller pores upstream and larger pores downstream;

a prefilter upstream of said plurality of hydrophobic layers, said prefilter including a plurality of layers having a positive density gradient, said layers of said prefilter including a first layer having a Frazier air permeability of from 15 to 25 cfm/ft$^2$ at 0.5" $H_2O$ $\Delta P$ and an average basis weight of 80±10 lb/3000 ft$^2$, a second layer having a Frazier air permeability of from 8 to 15 cfm/ft$^2$ at 0.5" $H_2O$ $\Delta P$ and an average basis weight of 60+15 lb/3000 ft$^2$, and a third layer having a Frazier air permeability of from 2 to 5 cfm/ft$^2$ at 0.5" $H_2O$ $\Delta P$ and an average basis weight of 83±15 lb/3000 ft$^2$.

8. The coalescer in claim 7 including a drainage layer downstream of said plurality of layers.

9. The coalescer in claim 8 wherein said drainage layer has a Frazier air permeability of from 800 to 1000 cfm/ft$^2$ at 0.5" $H_2O$ $\Delta P$ and an average weight of 99±6 lb/3000 ft$^2$.

10. The coalescer in claim 8 wherein said drainage layer is of synthetic felt.

11. The coalescer in claim 8 wherein said drainage layer is of polyester felt.

12. The coalescer in claim 8 further comprising a synthetic media layer downstream of said drainage layer having a Frazier air permeability of about 1600 cfm/ft$^2$ at 0.5" $H^2O$ $\Delta P$, an average basis weight of about 0.6 oz/yd$^2$, and a thickness of about 4 mils.

13. The coalescer in claim 12 wherein the synthetic media layer is of polyester.

14. The coalescer in claim 7 including a porous retention screen downstream of said plurality of hydrophobic layers.

15. The coalescer in claim 14 wherein said porous retention screen is coated with polyvinylchloride.

16. The coalescer in claim 7 wherein said prefilter layers have a positive density gradient and said hydrophobic layers are of polymeric material.

17. The coalescer in claim 7 wherein said plurality of hydrophobic layers are cylindrical in configuration.

18. The coalescer in claim 7 wherein said plurality of hydrophobic layers are cylindrical in configuration and said prefilter is within said hydrophobic layers.

19. An apparatus for removing water from hydrocarbon fluid under surfactant conditions, comprising:

a fluid inlet;

a fluid outlet;

a prefilter comprising a plurality of glass fiber layers having a positive density gradient from inlet to outlet; and a coalescer comprising porous hydrophobic media for passage of hydrocarbon fluids therethrough, said media comprising a plurality of hydrophobic layers, said hydrophobic layers having a negative density gradient from inlet to outlet, said hydrophobic layers including a first layer having a Frazier air permeability of from 8 to 15 $cfm/ft^2$ at 0.5" $H_2O$ $\Delta P$ and an average basis weight of 246±10 $lb/3000$ $ft^2$, a second layer having a Frazier air permeability of from 120 to 170 $cfm/ft^2$ at 0.5" $H_2O$ $\Delta P$ and an average basis weight of 168±10 $lb/3000$ $ft^2$, and a third layer having a Frazier air permeability of from 800 to 1000 $cfm/ft^2$ at 0.5" $H_2O$ $\Delta P$ and an average basis weight of 99±6 $lb/3000$ $ft^2$.

20. The coalescer of claim 19 wherein said plurality of hydrophobic layers are of polymeric material.

21. The coalescer in claim 19 wherein said plurality of hydrophobic layers are of polypropylene and polyester.

22. The coalescer in claim 19 wherein said plurality of layers of said prefilter include a first layer having a Frazier air permeability of from 15 to 25 $cfm/ft^2$ at 0.5" $H_2O$ $\Delta P$ and an average basis weight of 80±10 $lb/3000$ $ft^2$, a second layer having a Frazier air permeability of from 8 to 15 $cfm/ft^2$ at 0.5" $H_2O$ $\Delta P$ and an average basis weight of 60±15 $lb/3000$ $ft^2$, and a third layer having a Frazier air permeability of from 2 to 5 $cfm/ft^2$ at 0.5" $H_2O$ $\Delta P$ and an average basis weight of 83±15 $lb/3000$ $ft^2$.

23. The coalescer in claim 22 including a drainage layer downstream of said coalescer.

24. The coalescer in claim 23 wherein said drainage layer has a Frazier air permeability of from 800 to 1000 $cfm/ft^2$ at 0.5" $H_2O$ $\Delta P$ and an average basis weight is 99±6 $lb/3000$ $ft^2$.

25. The coalescer in claim 24 wherein said drainage layer is of synthetic felt.

26. The coalescer in claim 24 wherein said drainage layer is of polyester felt.

27. The coalescer in claim 26 including a porous retention screen downstream of said plurality of hydrophobic layers.

28. The coalescer in claim 19 wherein said hydrophobic layers are cylindrical in configuration and fluid flows radially outwardly from the inlet to the outlet.

29. A coalescer for removing water from hydrocarbon fluids, comprising:

media for passage of hydrocarbon fluids therethrough, said media comprising a plurality of layers, said layers having a negative density gradient with smaller pores upstream and larger pores downstream, said layers including a first layer having a Frazier air permeability of from 8 to 15 $cfm/ft^2$ at 0.5" $H_2O$ $\Delta P$ and an average basis weight of 246±10 $lb/3000$ $ft^2$, a second layer having a Frazier air permeability of from 120 to 170 $cfm/ft^2$ at 0.5" $H_2O$ $\Delta P$ and an average basis weight of 168±8 $lb/3000$ $ft^2$, and a third layer having a Frazier air permeability of from 800 to 1000 $cfm/ft^2$ at 0.5" $H_2O$ $\Delta P$ and an average basis weight of 99±6 $lb/3000$ $ft^2$.

30. The coalescer in claim 29 including a prefilter upstream of said plurality of layers.

31. The coalescer in claim 30, wherein the prefilter comprises a plurality of hydrophilic layers.

32. The coalescer in claim 31 in which said plurality of hydrophilic layers having a positive density gradient include a first layer having a Frazier air permeability of from 15 to 25 $cfm/ft^2$ at 0.5" $H_2O$ $\Delta P$ and an average basis weight of 80±10 $lb/3000$ $ft^2$, a second layer having a Frazier air permeability of from 8 to 15 $cfm/ft^2$ at 0.5" $H_2O$ $\Delta P$ and an average basis weight of 60±15 $lb/3000$ $ft^2$ and a third layer having a Frazier air permeability of from 2 to 5 $cfm/ft^2$ at 0.5" $H_2O$ $\Delta P$ and an average basis weight of 83+15 $lb/3000$ $ft^2$.

33. The coalescer in claim 31 including a drainage layer downstream of said plurality of hydrophilic layers.

34. The coalescer in claim 33, wherein said drainage layer has a Frazier air permeability of from 800 to 1000 $cfm/ft^2$ at 0.5" $H_2O$ $\Delta P$ and an average weight of 99±6 $lb/3000$ $ft^2$.

35. The coalescer in claim 34, wherein said drainage layer is of synthetic felt.

36. The coalescer in claim 34 wherein said drainage layer is of polyester felt.

* * * * *

UNITED STATES PATENT AND TRADEMARK OFFICE
CERTIFICATE OF CORRECTION

PATENT NO. : 6,422,396 B1
DATED : July 23, 2002
INVENTOR(S) : Yu Li et al.

It is certified that error appears in the above-identified patent and that said Letters Patent is hereby corrected as shown below:

Column 5,
Line 54, after "a" delete "." (period);

Column 9,
Line 7, "DiEGME    Aldrich Chemical    0.20% 1.895    liter" should be
    -- DiEGME    Aldrich Chemical    0.20%          1.895 liter --;

Column 12,
Line 11, "is" should be -- of --;
Line 48, "83+15 lb/3000 ft$^2$" should be -- 83 ± 15 lb/3000 ft$^2$ --.

Signed and Sealed this

Twenty-first Day of January, 2003

JAMES E. ROGAN
*Director of the United States Patent and Trademark Office*